L. S. BORTREE.
HORSE HAY RAKE.
No. 104,545. Patented June 21, 1870.
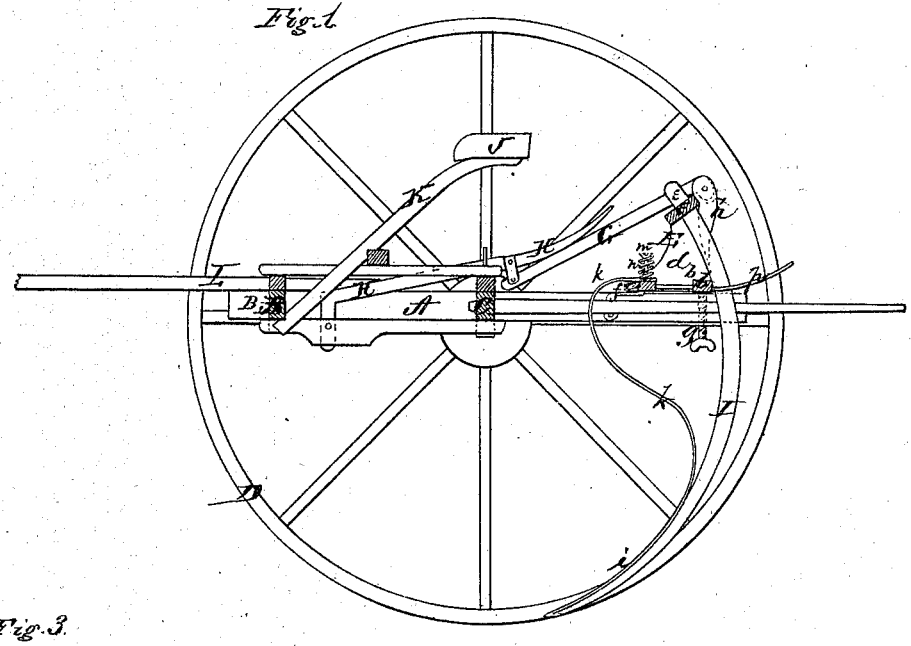
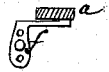
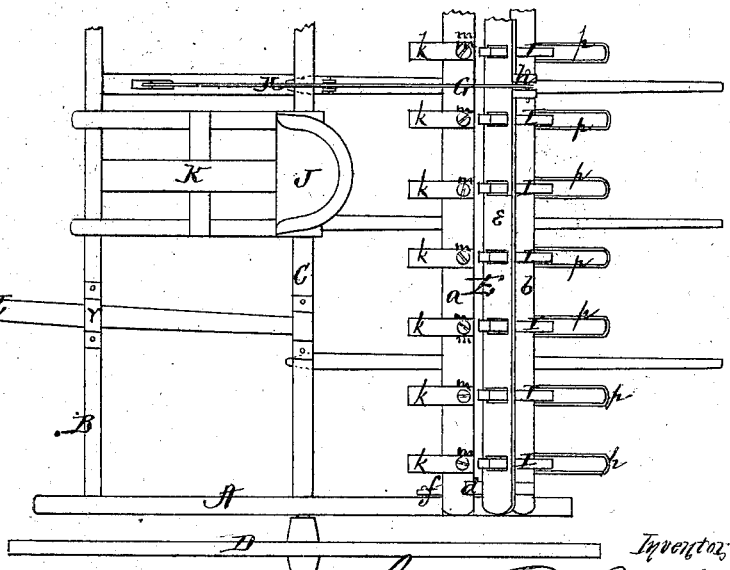
Witnesses
Harry King
C. L. Ewert
Inventor
Lewis S. Bortree
per Alexander Mason
Atty.

United States Patent Office.

LEWIS S. BORTREE, OF GRAND RAPIDS, MICHIGAN.

Letters Patent No. 104,545, dated June 21, 1870.

IMPROVEMENT IN HORSE HAY-RAKES.

The Schedule referred to in these Letters Patent and making part of the same.

*To all whom it may concern:*

Be it known that I, LEWIS S. BORTREE, of Grand Rapids, in the county of Kent and in the State of Michigan, have invented certain new and useful Improvements in Horse Hay-Rakes; and do hereby declare that the following is a full, clear, and exact description thereof, reference being had to the accompanying drawing and to the letters of reference marked thereon making a part of this specification.

The nature of my invention consists in the combination of the movable rake-teeth with the rake-head, and the arrangement of a cross-shaft with the coil-springs, secured by a stud, from which extend flat springs, which bear against the front of the teeth; also, in the construction and arrangement of the parts of a horse hay-rake, as more fully hereinafter set forth.

In order to enable others skilled in the art to which my invention appertains to make and use the same, I will now proceed to describe its construction and operation, referring to the annexed drawing, in which—

Figure 1 is a vertical cross-section of my rake;

Figure 2 is a plan view of the same;

Figure 3 is a view of an elbow that pivots rake-head to the frame; and

Figure 4 is a front view of the device for regulating the thills.

The frame of my hay-rake consists of two side beams, A A, connected near their front ends by a beam, B, and at their center by another beam, C, from the ends of which latter beam, axles project for the wheels D D.

The rake-head E consists of two bars, $a$ and $b$, connected at their ends by end pieces $d$ $d$, which rise above the bars $a$ $b$, and support, at their upper ends, another bar, $e$.

The head E is hinged to the frame by means of elbows $f f$, the ends of the bars $a$ $b$ resting upon the upper side of the side beams A A near their rear ends.

The elbows $f f$ are secured to the under side of the bar $a$, and pivoted to the inner sides of the bars or beams A.

The elbows are provided with several holes in their lower parts, so that, by taking out the bolts that pivot them to the frame, the head can be raised or lowered, so as to put the points of the teeth close to the ground, or raise them up, as may be needed.

Under the back part of the head, that is, under the bar $b$, through the side beams A A, are set-screws $g$, so as to change the points of the teeth in any desired position.

At a suitable point in the rake-head E is a standard or forked arm, $h$, to which is pivoted a rod, G, the front end of said rod being pivoted to a lever, H, which, in turn, is pivoted at a suitable point in the frame, the two forming a lock-lever, to raise and lower the rake at will, said lock-lever dropping down at the side of the driver's seat, J, arranged on the bar K, as shown in the drawing.

The rake-teeth I I are sawed out in the required circular or curved shape, and faced with iron, $i$, at the point, and for a suitable distance up along the front side, as seen in fig. 1.

The usual bent tooth has the serious defect that it will not hold its shape. Being exposed to the weather, it will straighten out, so as to spoil the rake entirely. But, by sawing the tooth out in the proper shape, and facing it with iron, the tooth is strengthened, and prevented from straightening.

The teeth are attached in the following manner:

A flat spring, $k$, is attached to the tooth, on the front side, directly above the upper end of the iron facing, $i$, said spring being curved, as shown in fig. 1, and its upper end passing in front of and then on top of the bar $a$ of the rake-head, where it is held in position by a screw, $m$.

Above the upper end of the spring $k$, between it and the head of the screw $m$, is a coil-spring, $n$, thus making it a double spring for attaching the tooth.

The upper ends of the teeth pass through loops $p$ $p$, extending from the rear side of the bar $b$, and they then pass up through mortises in the bar $e$.

The usual single spring has the objection that there is so much labor for it to perform that it cannot do it on uneven ground. With the double spring, the flat spring $k$ takes the first strain that holds the tooth in position; then, as the tooth is drawn back, and raised up, it throws the rest of the strain on the coil-spring $n$, thereby making it perfectly easy and safe on the flat spring.

On the front bar B, at suitable points, are metal loops, $r$ $r$, through which the thills L pass; and under these thills are set-screws, $s$, so as to regulate them according to the size of the horse, thereby keeping the frame level.

Having thus fully described my invention,

What I claim as new, and desire to secure by Letters Patent, is—

1. The combination of the slotted rake-head E and movable rake-teeth I, with the cross-shaft $a$, with studs $m$, securing the coil-springs $n$, and curved flat springs $k$, whose ends bear upon the teeth I, all substantially as set forth.

2. The combination of the slotted rake-head E, metal-bound teeth I, elbows $f$, set-screws $g$, shaft $a$, with springs $n$ and $k$ and levers H G, with the frame A, all as set forth.

In testimony that I claim the foregoing, I have hereunto set my hand this 25th day of February, 1870.

LEWIS S. BORTREE.

Witnesses:
BENJAMIN A. HARLAN,
SAM. B. SINCLAIR.